United States Patent
Soldano et al.

(10) Patent No.: US 10,764,354 B1
(45) Date of Patent: Sep. 1, 2020

(54) TRANSMITTING DATA OVER A NETWORK IN REPRESENTATIONAL STATE TRANSFER (REST) APPLICATIONS

(71) Applicant: Red Hat, Inc., Raleigh, NC (US)

(72) Inventors: Alessio Soldano, Milan (IT); Ronald Sigal, New York, NY (US); Stephane Epardaud, Paris le Defense (FR)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/290,747

(22) Filed: Mar. 1, 2019

(51) Int. Cl.
*G06F 15/16* (2006.01)
*H04L 29/08* (2006.01)
*H04L 29/06* (2006.01)

(52) U.S. Cl.
CPC ............ *H04L 67/02* (2013.01); *H04L 67/06* (2013.01); *H04L 67/1097* (2013.01); *H04L 69/08* (2013.01)

(58) Field of Classification Search
USPC ....... 709/203, 206, 217, 219, 223, 224, 226, 709/228, 230, 232, 238; 717/104
See application file for complete search history.

(56) References Cited

U.S. PATENT DOCUMENTS

| | | | |
|---|---|---|---|
| 9,509,776 B2 | 11/2016 | Chou et al. | |
| 9,792,163 B1 * | 10/2017 | Chrysanthakopoulos | ................... G06F 3/0673 |
| 2014/0372970 A1 | 12/2014 | Broussard et al. | |
| 2015/0271229 A1 * | 9/2015 | Bullotta | ................. H04L 65/60 709/219 |
| 2015/0271271 A1 * | 9/2015 | Bullotta | ................ H04L 67/141 709/228 |
| 2015/0271299 A1 * | 9/2015 | Bullotta | .................. H04W 4/70 709/230 |
| 2015/0331675 A1 * | 11/2015 | De Magalhaes | .......... G06F 8/35 717/104 |
| 2018/0041588 A1 | 2/2018 | Straub et al. | |

OTHER PUBLICATIONS

"RestEasy JAX-RS" RESTful Web Services for Java, http://docs.jboss.org/resteasy/docs/3.6.1.Final/userguide/pdf/resteasy-reference-guide-en-US.pdf, 338 pages.
Manzoni, "Reactive APIs—a Non-Imperative Communication", https://medium.com/@rmzoni/reactive-apis-a-non-imperative-communication-84689cc3c9e, Apr. 25, 2018, 11 pages.
Nascimento, "Server-Sent Events with JAX-RS", https://medium.com/liferay-engineering-brazil/server-sent-events-with-jax-rs-a63ce1813d82, Dec. 26, 2017, 5 pages.
Bucek et al., "JAX-RS: JavaTM API for RESTful Web Services", https://download.oracle.com/otn-pub/jcp/jaxrs-2_1-or-spec/jaxrs-2_1-pr-spec.pdf?AuthParam=1545668161_491cb5778b9512521fb9367d941c1377, Version 2.1 Public Review, Apr. 18, 2017, 98 pages.

* cited by examiner

*Primary Examiner* — Quang N Nguyen
(74) *Attorney, Agent, or Firm* — Womble Bond Dickinson (US) LLP

(57) ABSTRACT

Techniques for transmitting data over a network in a representational state transfer (REST) application are provided. A request for data from a client computing device in a representational state transfer (REST) application is received and a wire protocol is selected based on user input from a plurality of wire protocols that will be used to transmit one or more objects to be returned by the request. The selected wire protocol is indicated to the client computing device and the one or more objects are transmitted to the client computing device using the determined wire protocol.

17 Claims, 6 Drawing Sheets

US 10,764,354 B1

TRANSMITTING DATA OVER A NETWORK IN REPRESENTATIONAL STATE TRANSFER (REST) APPLICATIONS

TECHNICAL FIELD

Aspects of the present disclosure relate to transmission of data over a network, and more particularly, to the transmission of data in a representational state transfer (REST) application.

BACKGROUND

Reactive programming is a computational model wherein data flows through a pipeline of computational elements. A computation progresses by injection of one or more data objects into one end of the pipeline, and the response of each computational element to the injection of a result from a previous computational element. In reactive programming, pipelines may be treated as first class objects. Programming languages that natively support (ex novo) the reactive model are available, but for an existing language, such as Java, reactive programming elements and capabilities can be grafted onto the language itself or added through libraries. Some languages, such as Java, may be modified using both methods. While many reactive programming models run inside a single Java Virtual Machine (JVM), other models may function across multiple JVMs in a network. The JAX-RS standard provides an application program interface (API) for implementing REST applications (including reactive programming models) over a network.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, certain reactive programming models may function across multiple JVMs and may therefore require means to represent reactive computational elements and reactive data flows over a network. However, data streams involved in reactive programming have various characteristics that can make transmission of objects in a reactive programming environment complicated. For example, data streams in reactive programming may be comprised of multiple objects, and may represent an unbounded (i.e. unlimited) number of objects. In addition, the data streams in a reactive programming model may consist of various types of objects ranging from simple objects such as an integer, to complex objects such as a Java Script Object Notation (JSON) object. Further, the timing of object creation can vary, from all objects being created at once, to delays of arbitrary and often times lengthy durations between creation of various objects in the data stream. Thus, transmitting large numbers of complex objects over a network in a manner that allows reactive programming models to execute efficiently may prove challenging. The JAX-RS standard, which provides an application program interface (API) for implementing representational state transfer (REST) applications over a network, is predicated on expressing computational decisions declaratively, so a means of expressing a choice of wire protocols declaratively is desirable.

The present disclosure addresses the above-noted and other deficiencies by using a processing device to receive a request for data from a client computing device in a representational state transfer (REST) application and select a wire protocol from a plurality of wire protocols based on user input, the selected wire protocol being used to transmit one or more objects to be returned by the request. The wire protocol corresponds to the one or more objects. The computing device may indicate to the client computing device the selected wire protocol and transmit the one or more objects to the client computing device using the selected wire protocol.

Figure 1A:
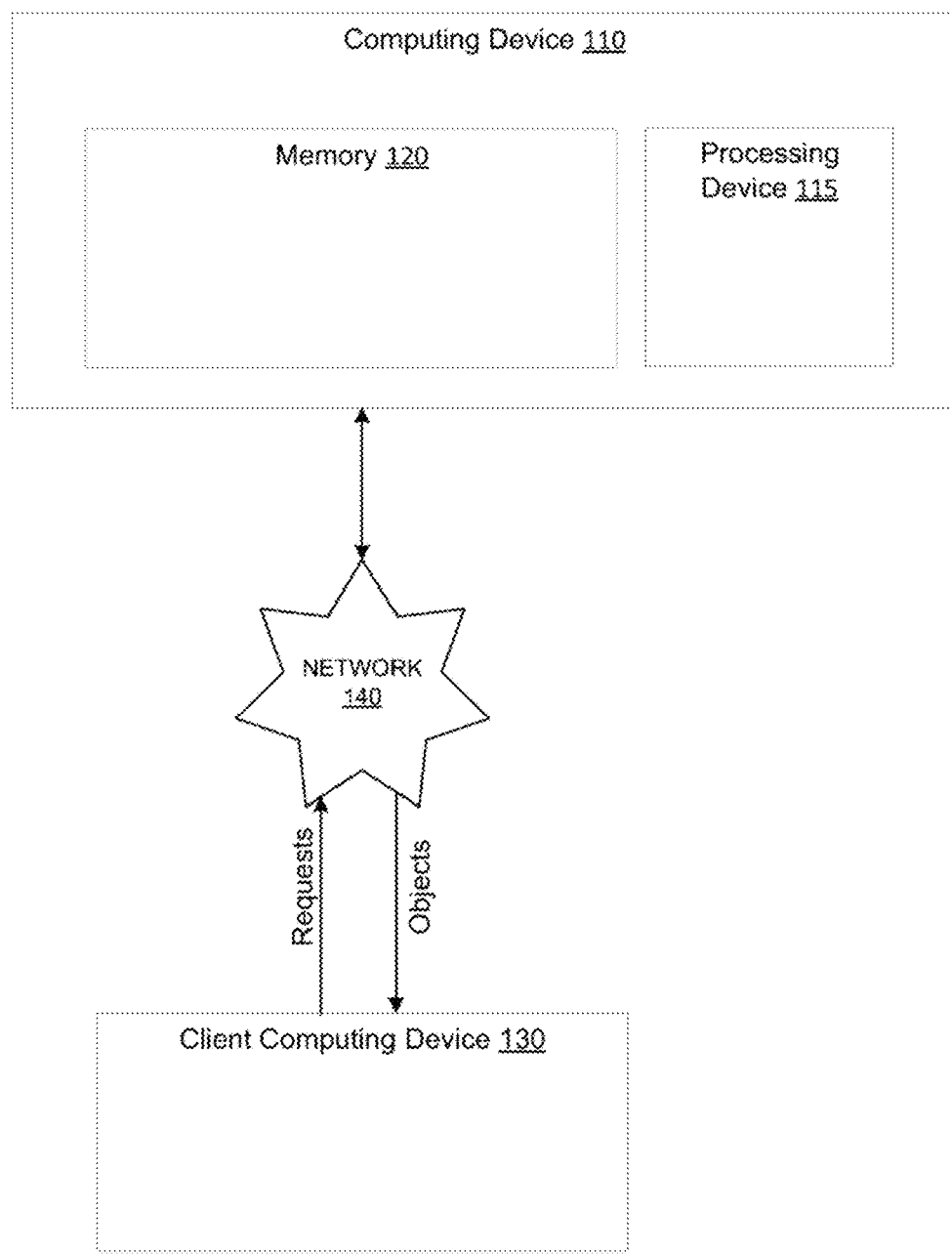
FIG. 1A is a block diagram that illustrates an example system, in accordance with some embodiments of the present disclosure.

FIG. 1A is a block diagram that illustrates an example system 100. As illustrated in FIG. 1, the system 100 includes computing device 110 and client computing device 130, and a network 140. The computing device 110 and the client computing device 130, may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing device 110 and the client computing device 130.

Computing device 110 may include memory 120, which may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices Each computing device may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The computing devices 110 and 130 may comprise any suitable type of computing device or machine that has a programmable processor including, for example, server computers, desktop computers, laptop computers, tablet computers, smartphones, set-top boxes, etc. In some examples, the computing devices 110 and 130 may comprise a single machine or may include multiple interconnected machines (e.g., multiple servers configured in a cluster). The computing device 110 and the client computing device 130 may be implemented by a common entity/organization or may be implemented by different entities/organizations. For example, computing device 110 may be operated by a first company/corporation and client computing device 130 may be operated by a second company/corporation. Each computing device 110 and 130 may execute or include an operating system (OS), as discussed in more detail below. The OS of a computing device 110 and 130 may manage the execution of other components (e.g., software, applications, etc.) and/or may manage access to the hardware (e.g., processors, memory, storage devices etc.) of the computing device. In some embodiments, computing devices 110 and 130 may be in a client/server relationship, with computing device 110 acting as a server and client computing device 130 acting as a client.

Figure 1B:
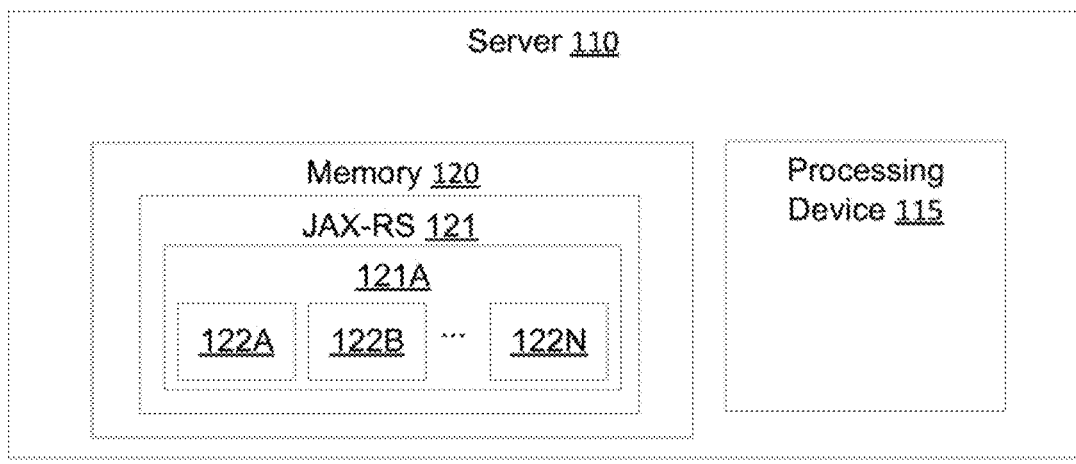
FIG. 1B is a block diagram that illustrates an example computing device, in accordance with some embodiments of the present disclosure.

FIG. 1B illustrates computing device 110 in accordance with some embodiments of the present disclosure. FIG. 1B also illustrates the software components within memory 120 of computing device 110. Memory 120 may include the JAX-RS module 121, which may provide an application program interface (API) for implementing representational state transfer (REST) applications. REST is a style of information application architecture that aligns distributed applications to hyper-text transfer protocol (HTTP) requests and response protocols. In particular, REST matches hypermedia to HTTP request methods and Uniform Resource Identifiers (URI). FIG. 1B also illustrates wire protocol module 121A that may execute inside the JAX-RS module 121 to provide multiple wire protocols as discussed in further detail herein. Each wire protocol may be represented by an annotation from among the annotations 122A-N as discussed further herein. Wire protocol module 121A may further receive from a user, or developer, a request for data having a URL path that selects a particular wire protocol for transmitting objects to be returned in response to the request for data. JAX-RS module 121 and wire protocol module 121A may be executed by processing device 115 to perform the functions described herein with respect to FIGS. 1B, 2, and 3, for example.

The JAX-RS module 121 together with wire protocol module 121A may provide a plurality of wire protocols, each of which execute inside the JAX-RS module 121 and function to transmit data between computing devices 110 and 130 when more than one application has to interoperate. In contrast to transport protocols at the transport level (like TCP or UDP), wire protocols represent information at the application level and may describe the valid sequence of data that flows over a network (between the APIs of multiple parties) to accomplish some higher-level task. JAX-RS module 121 may provide a non-streaming wire protocol for transmitting data to a client (e.g. in response to a request for data from the client) that does not need to be streamed. The non-streaming protocol may be appropriate where, for example, an entire sequence of objects may be transmitted in one transmission. In some embodiments, this can occur when a single object is to be returned by the request for data, or when there are multiple simple objects and there is little to no delay between creation of the multiple simple objects to be returned by the request for data (i.e. all of the objects to be returned are created at once or nearly simultaneously). This allows all of the objects to be transmitted in a single transmission. The non-streaming protocol may be represented by annotation 122N, for example.

The JAX-RS module 121 together with wire protocol module 121A may provide multiple streaming wire protocols for streaming data to a client (e.g. in response to a request for data from the client) in a REST application. Each streaming wire protocol may be represented by an annotation from among annotations 122A-122N. Each of the streaming wire protocols may provide for streaming of the objects to be returned in response to requests for data received from the client. Unlike a non-stream wire protocol that returns the connection (e.g. with the client) to a common connection pool for reuse, after transmitting data, streaming wire protocols keep the connection active. In this manner, if and when a state change is detected, the new data corresponding to the state change can be sent. Streaming wire protocols thus allow objects to be transmitted to the client as they are created. If one or more objects are created simultaneously, or within a certain delay threshold of each other, those objects may be transmitted to the client together in a single transmission without waiting for other objects to be returned to be created. Thereafter, as additional objects to be returned are created, they may be transmitted as well. This incremental transmission of data results in reducing delays in data processing in reactive programming as well as other computationally intensive applications. For example, in a reactive programming environment, receiving data incrementally may allow the client to proceed through each computational element in the data pipeline more quickly and efficiently. This is because computational elements in the pipeline that are executed at the client side do not need to wait for all of the objects to be returned to be created before they are transmitted. Each of the streaming wire protocols may be suitable for data streams having particular characteristics as described herein.

The JAX-RS module 121 together with wire protocol module 121A may provide bounded and un-bounded raw streaming protocols as well as a general streaming protocol for transmitting data to a client. The bounded raw streaming protocol may transmit one or more simple objects (e.g., character or integer data) over multiple transmissions and is used when the one or more simple objects comprise a bounded number of objects. The un-bounded raw streaming protocol may transmit one or more simple objects over multiple transmissions and is used when the one or more simple objects comprise an un-bounded number of objects. The general streaming protocol may transmit an arbitrary number of complex objects (e.g., Java Script Object Notation (JSON) object) over multiple transmissions. Each annotation 122A-N may represent a particular wire protocol. For example, annotation 122A may represent the bounded raw streaming protocol while annotation 122B may represent the un-bounded raw streaming protocol. In addition, annotation 122C (not shown in the FIGS.) may represent the general streaming protocol.

When the computing device 110 receives a request for data from a client (e.g., client computing device 130), wire protocol module 121A may, based on the request, select an appropriate wire protocol to use for transmitting any objects to be returned by the request for data to the client. The request for data may be any appropriate HTTP request originating from a REST application, one using for example, the HTTP "GET" verb. The request received may include a URL path, which is used to select an annotated resource method for providing a response, where an annotation on the method indicates the desired wire protocol. For example, upon receiving an HTTP request having a URL path that specifies a resource method with annotation 122A, wire protocol 121A may select the bounded raw streaming protocol to transmit any object to be returned by the HTTP request to the user/client.

The appropriate wire protocol is based on (i.e., corresponds to) the characteristics of the objects to be returned by the request. The user may determine the appropriate wire protocol based on the characteristics of the objects to be returned by the request. More specifically, the appropriate wire protocol may be determined based on the number of objects to be returned, the type of objects to be returned, and the timing of creation of the objects to be returned. With respect to the type of objects to be returned, certain objects may be complex objects, such as JSON objects. A JSON object may be an object returned as part of a reactive programming data pipeline. The objects to be returned may also include simple objects such as characters, integers or bytes. With respect to the timing of creation of objects, there may be delays between creation of the various objects to be returned by a request for data. Such delays may be of various lengths, and the delay between each object to be created may be different. In some embodiments, the delay between creation of the objects to be returned may be arbitrary, thus the objects may be created intermittently. Further, the number of objects to be returned may be large or small. The number of objects to be returned may be bounded, or in some embodiments, may be unbounded.

For example, if there is little to no delay between creation of the objects to be returned by a request for data (i.e. all of the objects to be returned are created at once or nearly simultaneously) then, in some embodiments, the request for data may include a URL path that specifies annotation 122N, indicating that the non-streaming wire protocol is appropriate for use.

In another example, the computing device 110 may receive a request for data that intermittently writes a stream of simple characters such as "ab" "cde" "f" and "ghij." Because of the inconsistent delay between the creation of objects "ab" "cde" "f" and "ghij," and because the characters are a bounded set of data, the request may include a URL path that specifies annotation 122A, indicating to the wire protocol module 121A that the bounded raw streaming protocol is appropriate for this transmission. The characters may be transmitted onto the network 140, concatenated by TCP for example, and arrive at the client computing device 130 as "abcdefghij." Alternatively, if TCP is used to segregate the characters into multiple packets, the characters would arrive as "abcd" "e" "fghij." Although illustrated as text characters in this example, the objects can be any simple object such as characters, integers, or bytes. When the wire protocol module 121A selects the bounded raw streaming protocol for use, it may also transmit an indication to the client computing device to inform the client computing device that it may potentially process the returned stream as a single object or multiple objects.

In addition, the computing device 110 may receive a request for data that returns an un-bounded number of simple elements (that are intermittently created). Thus, the request for data may include a URL path that specifies annotation 122B, indicating that the un-bounded raw streaming protocol is to be selected for such a transmission. When wire protocol module 121A selects the un-bounded raw streaming protocol to be used, it may also transmit an indication to the client to inform the client that it should not attempt to try and process the returned stream as a single object.

In another example, a request for data may involve the return of a large number of complex objects, often times having irregular delays between the creation of each object to be returned. Upon receiving the request, wire protocol module 121A may determine that the request specifies annotation 122C, indicating that the general streaming protocol is to be selected for transmitting the objects to be returned by the request. Raw streaming does not provide for boundaries within the data, thus making it difficult to reconstitute a sequence of serialized complex objects at the client side. The general streaming protocol is based on the server sent events (SSE) specification (not shown), that is included as part of the JAX-RS 121 module and is designed to overcome the above mentioned shortcoming as discussed in further detail herein with respect to FIGS. 3 and 4.

Figure 2:
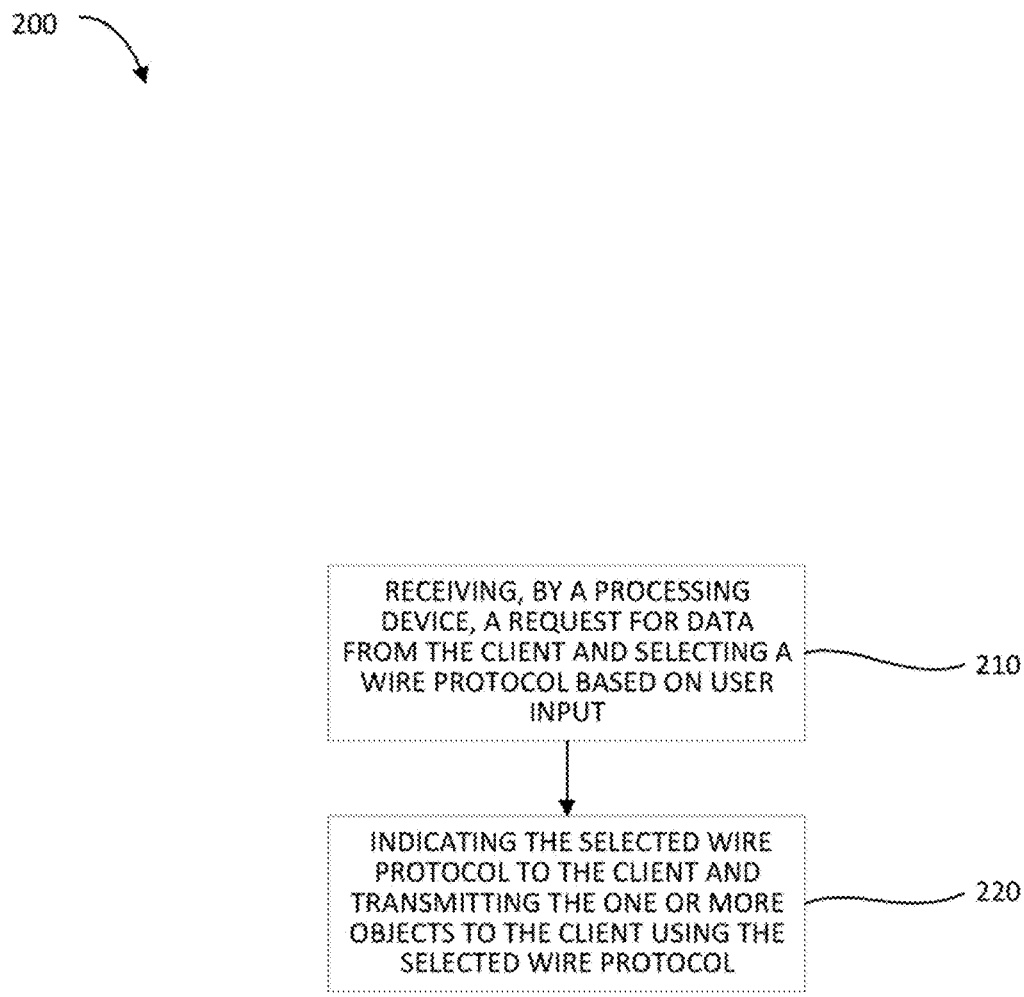
FIG. 2 is a flow diagram of a method of transmitting data over a network in a representational state transfer (REST) application, in accordance with some embodiments of the present disclosure.

FIG. 2 is a flow diagram illustrating a method 200 for transmitting data over a network in a reactive programming environment in accordance with some embodiments. Method 200 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 200 may be performed by a computing device (e.g., computing device 110 illustrated in FIGS. 1A and 1B).

The method 200 begins at block 210 where computing device 110 may receive a request for data from the client and select, based on the request, a wire protocol from a plurality of available wire protocols for transmitting the objects to be returned by the request to the client. Computing device 110 may provide the plurality of wire protocols using the JAX-RS 121 module as well as wire protocol module 121A as discussed herein. The request may be received from the client (e.g., client computing device 130) via a representational state transfer (REST) application in a reactive programming framework, for example. A user may determine the appropriate wire protocol based on the characteristics of the objects to be returned by the request. For example, the appropriate wire protocol may be determined based on the number of objects to be returned, the type of objects to be returned, and the timing of creation of the objects to be returned. The user may provide an indication of the appropriate wire protocol to computing device 110 in the request itself as described herein. Computing device 110 may (via wire protocol module 121A) select the indicated wire protocol based on the request. At block 220, the computing device 110 may transmit the objects to be returned to the client using the selected wire protocol.

In some embodiments, computing device 110 may include information about the selected wire protocol to aid the client in processing the received objects. For example, computing device 110 may indicate that the un-bounded raw streaming protocol is being used, and therefore that the client should not attempt to process the received objects as a single object. In this way, the client (e.g. client computing device 130) may adapt its method for processing received data based on the wire protocol being used.

Figure 3:
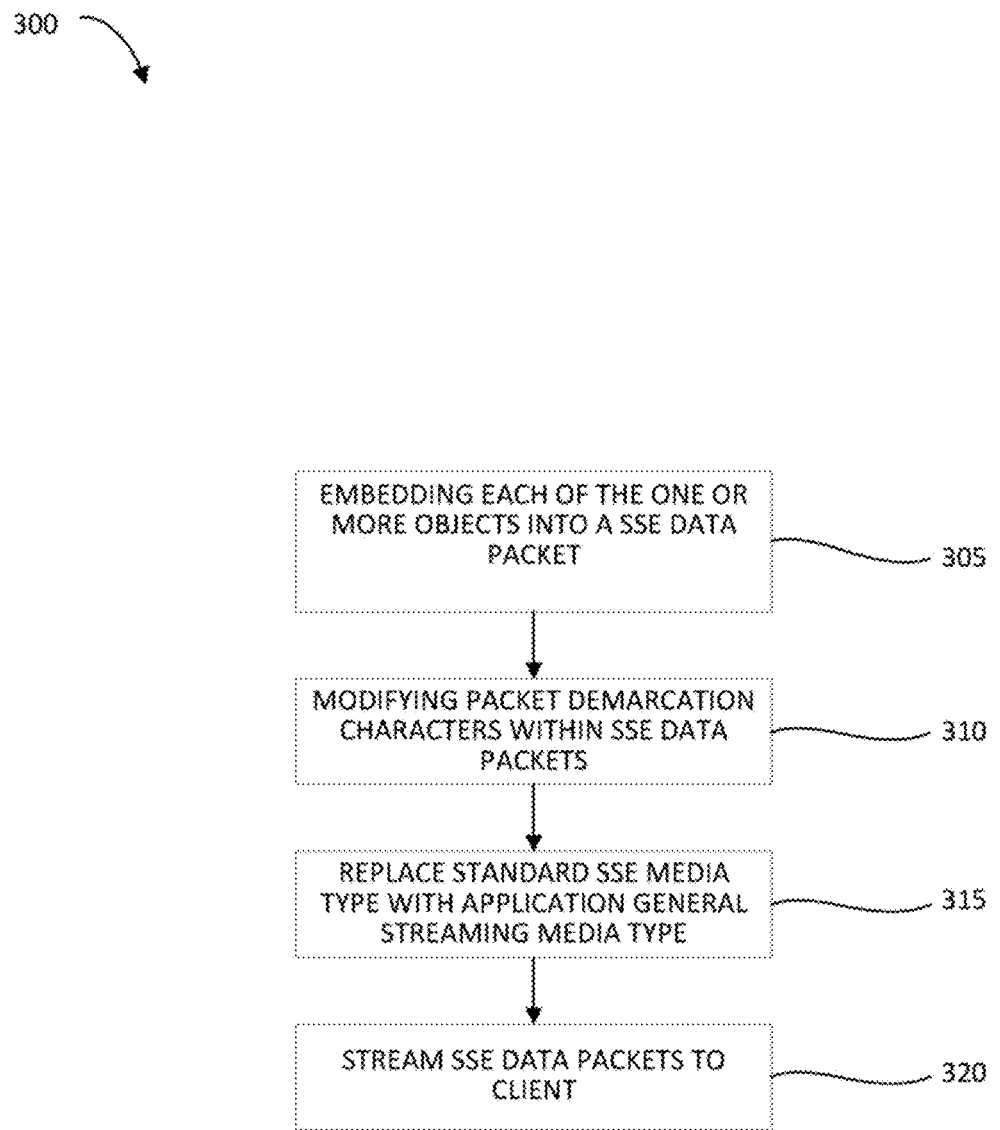
FIG. 3 is a flow diagram of a method of transmitting data in accordance with a general streaming protocol, in accordance with some embodiments of the present disclosure.

FIG. 3 illustrates a method 300 of streaming data according to the general streaming protocol, in accordance with some embodiments of the present disclosure. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a computing device (e.g., computing device 110 illustrated in FIGS. 1A and 1B).

The method 300 begins at block 305, where, upon selecting the general streaming protocol for use in response to a user input (e.g., after receiving a request for data wherein the objects to be returned in response to the request comprise an arbitrary number of complex objects), computing device 110 may embed each object to be returned into a server sent event (SSE) data packet. Computing device 110 may embed each object as it is created. At block 310, computing device 110 may modify packet demarcation characters occurring within SSE data packets as described in further detail with respect to FIG. 4. The SSE specification includes certain characters used for packet demarcation, and thus does not ordinarily support non-text data. However, computing device 110 may modify such packet demarcation characters that occur within SSE data packets, so that they are recognized as data characters instead of a demarcation character while ignoring packet demarcation characters that occur between SSE data packets. In this way, the general streaming protocol may stream data types beyond text data. At block 315, the computing device 110 may also change the standard SSE specification media type to allow objects having media types other than text/character data to be streamed. In some embodiments, computing device 110 may change the standard SSE specification media type to a general streaming media type. At block 320, computing device 110 may stream the SSE data packets to the client using the SSE specification.

For example, if 3 of the objects to be returned are initially created simultaneously or near simultaneously, computing device 110 may perform the operations described above with respect to FIG. 3 on those three objects and transmit them to the client. After a time delay, another 2 objects may be created (again, simultaneously or near simultaneously) and computing device 110 may perform the operations described above again on those 2 objects and transmit them to the client. In this way, the objects to be returned may be streamed (i.e. incrementally transmitted) to the client, allowing the client to more efficiently process data in a REST application without delays. For example, in a reactive programming environment, receiving data incrementally may allow the client to proceed through computational elements in the data pipeline more quickly and efficiently. This is because computational elements executed at the client side do not need to wait for all of the objects that will be returned to be created before they are transmitted.

Figure 4:
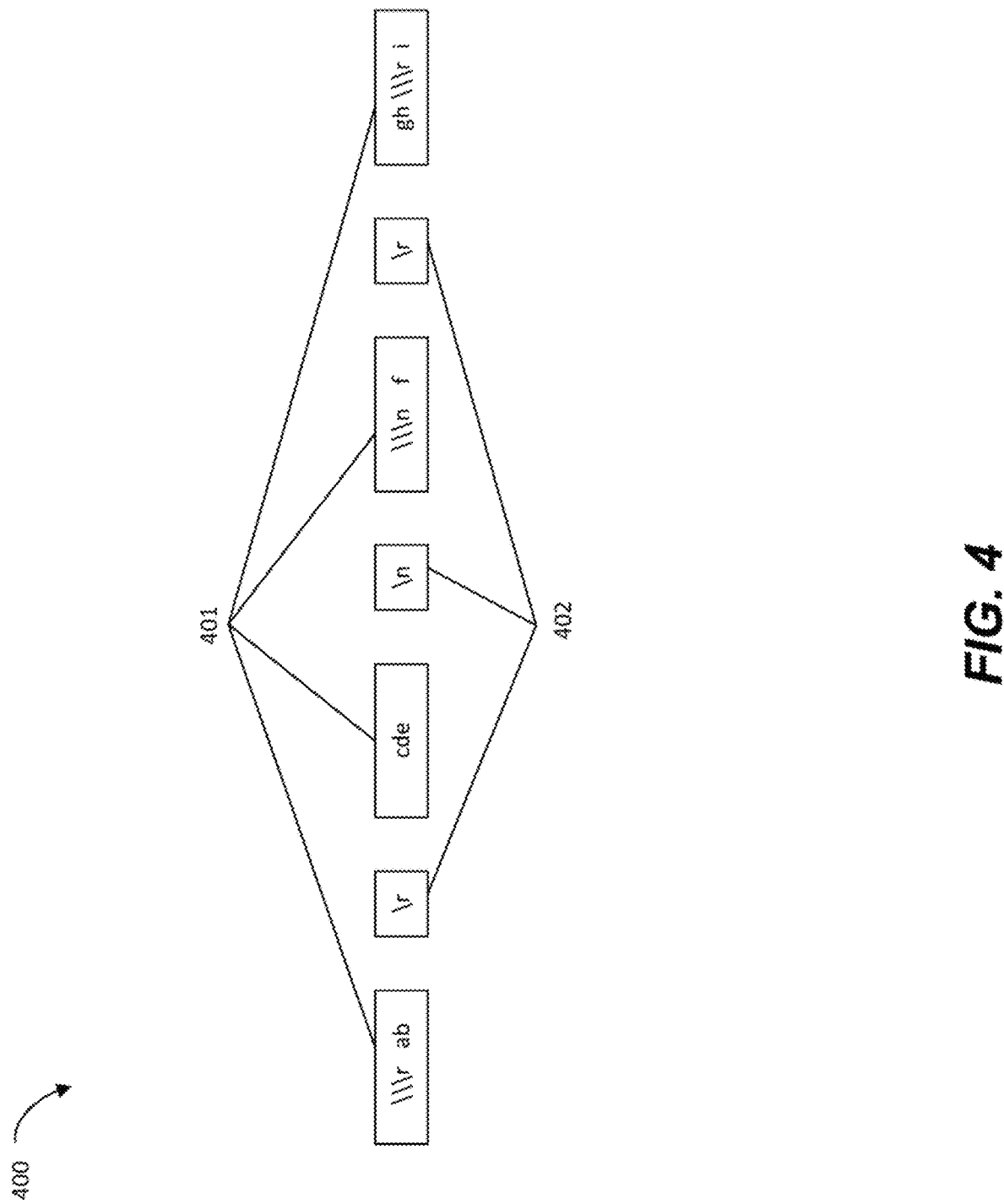
FIG. 4 is a block diagram of an example server sent event (SSE) data stream, in accordance with some embodiments of the present disclosure.

FIG. 4 is a diagram illustrating a series of SSE data packets 401 in accordance with some embodiments of the present disclosure. FIG. 4 shows SSE data packets 401, and inter-packet SSE packet demarcation characters 402. Each inter-packet SSE packet demarcation character 402 may be placed between adjacent SSE data packets so as to indicate boundaries in the data stream. However, the inclusion of such characters within SSE data packets 401 (as illustrated in FIG. 4) limits the use of the SSE specification to the transmission of character/text data. However, as discussed above with respect to FIG. 3, this may be overcome by allowing the wire protocol module 121A to modify SSE demarcation characters occurring within SSE data packets 401 by preceding them with special characters (shown in FIG. 4 as a "††" character) when they occur within an SSE data packet. In this way, SSE demarcation characters occurring within SSE data packets 401 are recognized as data characters instead of as demarcation characters. Wire protocol module 121A does not modify inter-packet SSE packet demarcation characters 402, thereby allowing transmission of data types beyond character/text data.

Figure 5:
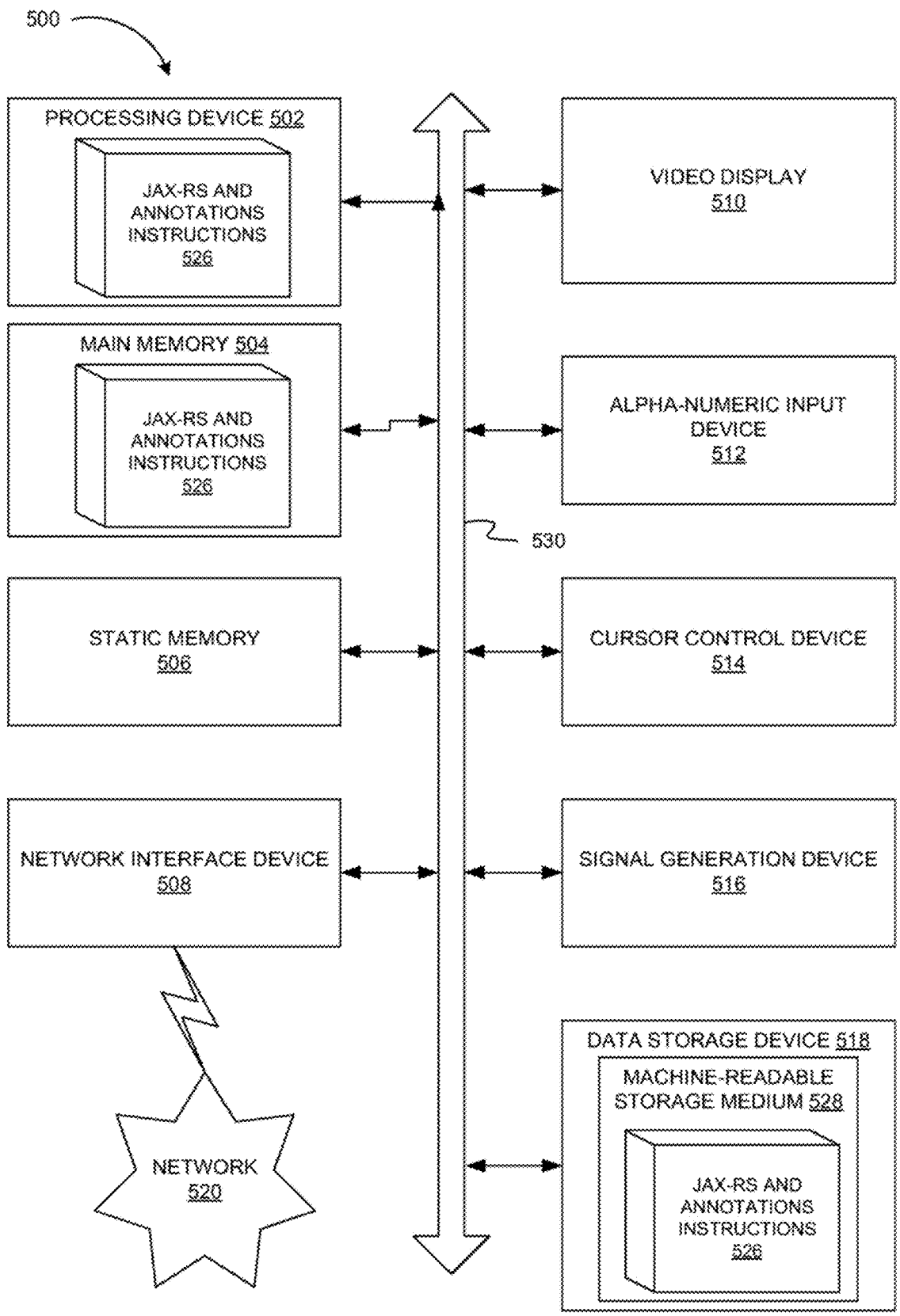
FIG. 5 is a block diagram of an example computing device that may perform one or more of the operations described herein, in accordance with some embodiments of the present disclosure.

FIG. 5 is a block diagram of an example computing device 500 that may perform one or more of the operations described herein, in accordance with some embodiments. For example, computing device 500 may analyze a request for data from a client in a representational state transfer (REST) application and select, based on user input, a wire protocol from a plurality of wire protocols that will be used to transmit one or more objects to be returned by the request. The user may determine the wire protocol to be selected based on the one or more objects to be returned, and the computing device 500 may indicate to the client the selected wire protocol and transmit the one or more objects to the client using the selected wire protocol. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions, e.g., instructions for carrying out the operations described herein, in accordance with one or more aspects of the present disclosure. JAX-RS and annotations instructions implementing module 526 may also reside, completely or at least partially, within main memory 504 and/or within processing device 502 during execution thereof by computing device 500, main memory 504 and processing device 502 also constituting computer-readable media. The instructions may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving, by a processing device, a request for data from a client computing device in a representational state transfer (REST) application and selecting a wire protocol from a plurality of wire protocols to transmit one or more objects to be returned by the request, the wire protocol being selected in view of a user input; and
   indicating to the client computing device the selected wire protocol and transmitting the one or more objects to the client computing device using the selected wire protocol, wherein the selected wire protocol corresponds to a number of objects to be returned by the request, a type of each object to be returned by the request, and a timing of creation for each object to be returned by the request and wherein each wire protocol in the plurality of wire protocols transmits one or more objects of one or more types over one or more transmissions.

2. The method of claim 1, wherein the plurality of wire protocols comprises:
   a non-streaming protocol to transmit the one or more objects in a single transmission;
   a bounded raw streaming protocol to transmit the one or more objects over multiple transmissions when each of the one or more objects comprise a simple object and the one or more objects comprise a bounded number of objects;
   an unbounded raw streaming protocol to transmit the one or more objects over multiple transmissions when each of the one or more objects comprise a simple object and the one or more objects comprise an unbounded number of objects; and
   a general streaming protocol to transmit the one or more objects oxer multiple transmissions when the one or more objects comprise one or more complex objects.

3. The method of claim 2, wherein the one or more objects comprise one or more complex objects, and wherein transmitting the one or more objects using the general streaming protocol comprises:
   embedding each of the one or more objects into a server sent event (SSE) data packet; and
   transmitting each SSE data packet according to an SSE specification, wherein the general streaming protocol comprises one or more modifications to allow transmission of non-text data.

4. The method of claim 3, wherein the general streaming protocol comprises functionality for modifying SSE specification packet demarcation characters that occur within SSE data packets.

5. The method of claim 2, wherein the general streaming protocol, the bounded raw streaming protocol, and the unbounded raw streaming protocol each transmit the one or more objects incrementally.

6. The method of claim 1, wherein indicating the determined wire protocol to the client comprises indicating whether the one or more objects comprise a bounded or unbounded number of objects.

7. A system comprising:
   a memory; and
   a processing device operatively coupled to the memory, the processing device to:
      receive, by the processing device, a request for data from a client computing device in a representational state transfer (REST) application and select a wire protocol from a plurality of wire protocols to transmit one or more objects to be returned by the request, the wire protocol being selected in view of a user input;
      indicate to the client computing device the selected wire protocol and transmit the one or more objects to the client computing device using the selected wire protocol, wherein the selected wire protocol corresponds to a number of objects to be returned by the request, a type of each object to be returned by the request, and a timing of creation for each object to be returned by the request and wherein each wire protocol in the plurality of wire protocols transmits one or more objects of one or more types over one or more transmissions.

8. The system of claim 7, wherein the plurality of wire protocols comprises:
   a non-streaming protocol to transmit the one or more objects in a single transmission;
   a bounded raw streaming protocol to transmit the one or more objects over multiple transmissions when each of the one or more objects comprise a simple object and the one or more objects comprise a bounded number of objects;
   an unbounded raw streaming protocol to transmit the one or more objects over multiple transmissions when each of the one or more objects comprise a simple object and the one or more objects comprise an unbounded number of objects; and
   a general streaming protocol to transmit the one or more objects oxer multiple transmissions when the one or more objects comprise one or more complex objects.

9. The system of claim 8, wherein the one or more objects comprise one or more complex objects, and wherein to transmit the one or more objects using the general streaming protocol, the processing device is further to:
   embed each of the one or more objects into a server sent event (SSE) data packet; and
   transmit each SSE data packet according to an SSE specification, wherein the general streaming protocol comprises one or more modifications to allow transmission of non-text data.

10. The system of claim 9, wherein the general streaming protocol comprises functionality for modifying SSE specification packet demarcation characters that occur within SSE data packets.

11. The system of claim 8, wherein the general streaming protocol, the bounded raw streaming protocol, and the unbounded raw streaming protocol each transmit the one or more objects incrementally.

12. The system of claim 7, wherein to indicate the determined wire protocol to the client, the processing device is further to indicate whether the one or more objects comprise a bounded or unbounded number of objects.

13. A non-transitory computer-readable storage medium including instructions that, when executed by a processing device, cause the processing device to:
   receive, by the processing device, a request for data from a client computing device in a representational state transfer (REST) application and select a wire protocol from a plurality of wire protocols to transmit one or more objects to be returned by the request, the wire protocol being selected in view of a user input; and indicate to the client computing device the selected wire protocol and transmitting the one or more objects to the client computing device using the selected wire protocol, wherein the selected wire protocol corresponds to a number of objects to be returned by the request, a type of each object to be returned by the request, and a timing of creation for each object to be returned by the request and wherein each wire protocol in the plurality of wire protocols transmits one or more objects of one or more types over one or more transmissions.

14. The non-transitory computer-readable storage medium of claim 13, wherein the plurality of wire protocols comprises:

a non-streaming protocol to transmit the one or more objects in a single transmission;

a bounded raw streaming protocol to transmit the one or more objects over multiple transmissions when each of the one or more objects comprise a simple object and the one or more objects comprise a bounded number of objects;

an unbounded raw streaming protocol to transmit the one or more objects over multiple transmissions when each of the one or more objects comprise a simple object and the one or more objects comprise an unbounded number of objects; and a general streaming protocol to transmit the one or more objects over multiple transmissions when the one or more objects comprise one or more complex objects.

15. The non-transitory computer-readable storage medium of claim 14, wherein the one or more objects comprise one or more complex objects, and wherein to transmit the one or more objects using the general streaming protocol, the processing device is further to:

embed each of the one or more objects into a server sent event (SSE) data packet; and transmit each SSE data packet according to an SSE specification, wherein the general streaming protocol comprises one or more modifications to allow transmission of non-text data.

16. The non-transitory computer-readable storage medium of claim 15, wherein the general streaming protocol comprises functionality for modifying SSE specification packet demarcation characters that occur within SSE data packets.

17. The non-transitory computer-readable storage medium of claim 14, wherein the general streaming protocol, the bounded raw streaming protocol, and the unbounded raw streaming protocol each transmit the one or more objects incrementally.

\* \* \* \* \*